Patented July 28, 1942

2,291,079

UNITED STATES PATENT OFFICE 2,291,079

PAPER HAVING HIGH WET STRENGTH AND PROCESS OF PRODUCING THE SAME

Raymond P. Hofferbert, Stamford, Conn., assignor to American Cyanamid Company, New York, N. Y., a corporation of Maine No Drawing. Original application February 6, 1940, Serial No. 317,527. Divided and this application February 6, 1940, Serial No. 317,526

2 Claims. (Cl. 117—155)

This invention relates to the production of paper having a high wet strength and improved chemical resistance.

An object of this invention is to produce paper having a high wet strength. Another object of this invention is to provide a paper having a high wet strength and also good chemical resistance. Still another object of this invention is the production of paper having a high wet strength and sufficient flexibility to be useful for the ordinary purposes to which paper is applied.

These and other objects are attained by treating paper with an aqueous syrup containing a melamine-formaldehyde condensation product.

The following example in which the proportions are in parts by weight is given by way of illustration and not in limitation.

Example

| | Parts |
|---|---|
| Melamine | 78 |
| A 50% solution of isopropanol in water | 53 |
| Formalin (37% formaldehyde in water) | 100 |
| A 10% solution of triethanoline in water | 2.2 |

These substances are mixed and reacted at about 55–60° C. for 1–2 hours. During the reaction the pH is preferably maintained at about 7.0. The temperature may then be raised to about 70° C. for 20 minutes and then to about 75° C. for 20–30 minutes or until a clear syrup has been formed. This syrup is water-soluble and may be cooled to room temperature.

About 16 parts of the syrup prepared above are mixed with 184 parts of water and 11 parts of an accelerator solution containing 1.75% of a mixture consisting of 4 parts of hexamethylene tetramine and 30 parts of diammonium phosphate. This composition is applied to a paper sheet in any convenient manner as for example by the use of rolls, one of which dips into the treating solution, by spraying, etc. The treated paper is preferably passed through a set of squeeze rolls to remove the excess treating solution and to effect good impregnation of the paper. The resin content of the paper is thus adjusted to between 0.5 and 5%. The paper may be dried in an oven or other suitable apparatus at about 100° C., about 10 minutes being required for this operation. The dried impregnated paper is then cured at about 150° C. for approximately 3 minutes. The resulting treated paper has very high wet strength and good chemical resistance thereby rendering it suitable for various uses wherein these properties are particularly desirable.

Optionally the treated paper may be dried and cured simultaneously but it has been found that somewhat superior results are obtained if the paper be dried at around 100° C. and then the curing of the resin effected at about 135–150° C.

To obtain optimum properties only a small proportion of resin based on the weight of the dry paper should be applied, i. e., from about 0.5% to 5%. Larger proportions of resin render the paper unsuitable for most purposes.

Other materials may be mixed with or emulsified with the melamine-formaldehyde resin syrup in order to desirably modify the properties which are obtained with the melamine-formaldehyde resin alone. Examples of these are casein, rosin, albumen, alkyd resins, urea-formaldehyde resins, phenol-formaldehyde resins, etc. It is to be noted, however, that in order to obtain the desirable properties which result from the use of melamine-formaldehyde resins, it is necessary to utilize a substantial proportion of the melamine-formaldehyde condensation products, e. g., above about 25% of the total resin present should be melamine-formaldehyde condensation product.

In order to obtain good impregnation of the paper with the resinous syrup containing melamine-formaldehyde condensation products, suitable wetting agents may be incorporated such as for example sodium lauryl sulphate, sodium lauryl sulphonate, the soluble salts of the esters of sulphosuccinic acid (e. g., the sodium salt of the dioctyl ester of sulphosuccinic acid), the sodium salt of alkylated naphthalene sulphonic acids, ordinary soaps, etc. Suitable surface tension modifiers may also be incorporated in the impregnating solutions, e. g., ethanol, acetone, etc.

Obviously other catalysts may be used in place of the one described in the above example or the melamine-formaldehyde condensation product may be polymerized without the use of any catalyst. Examples of other suitable catalysts are: phosphoric acid, phthalic acid, the ammonium or amine salts of such acids, alum, ammonium chloride, etc. These may either be added to the resin treating solution or they may be applied to the paper after impregnation with the resinous syrup.

Higher or lower ratios of formaldehyde to melamine than that in the above example may be used, e. g., from about 1:1 up to 6:1 or even higher, although ratios between 2:1 and 4:1 are preferred.

Paper treated in accordance with my invention has a wide variety of uses, e. g., as filter paper for commercial filter presses, as packaging material for corrosive materials, as a stock paper for laminating, as wrapping material for damp articles such as meat, etc. Furthermore paper treated with melamine-formaldehyde condensation products as described herein is also suitable for paper towels, toilet tissues, etc.

This application is a division of my co-pending application Serial No. 317,527, filed February 6, 1940, and entitled "Method of producing paper having high wet strength and products thereof."

Obviously many modifications and variations in the processes and products described herein may be made without departing from the spirit and scope of the invention as defined in the appended claims.

I claim:
1. A process of increasing the wet strength of paper which comprises treating paper with an aqueous solution of a melamine-formaldehyde condensation product, adjusting the melamine-formaldehyde condensation product content so that the proportion of the condensation product is about 0.5-5% of the weight of the paper (dry basis) and polymerizing said condensation product.

2. Paper impregnated with about 0.5-5% of the weight of the paper (dry basis) of a melamine-foraldehyde resin, said paper having a higher wet strength than the same paper which has not been impregnated with resin.

RAYMOND P. HOFFERBERT.

CERTIFICATE OF CORRECTION.

Patent No. 2,291,079.

July 28, 1942.

RAYMOND P. HOFFERBERT.

It is hereby certified that error appears in the printed specification of the above numbered patent requiring correction as follows: Page 1, first column, line 24, for "triethanoline" read --triethanolamine--; and that the said Letters Patent should be read with this correction therein that the same may conform to the record of the case in the Patent Office.

Signed and sealed this 27th day of October, A. D. 1942.

(Seal)

Henry Van Arsdale,
Acting Commissioner of Patents.